United States Patent Office 3,290,228
Patented Dec. 6, 1966

3,290,228
TEST COMPOSITION AND DEVICE FOR DETECTING GLUCOSE
Neil Butters Clissold Gretton, Welwyn Garden City, England, and James T. Rees, Porthcawl, Glamorgan, Wales, assignors to Miles Laboratories Inc., Elkhart, Ind., a corporation of Indiana
No Drawing. Filed July 29, 1964, Ser. No. 386,064
7 Claims. (Cl. 195—127)

This invention relates to the detection of glucose and more particularly to improved glucose-testing compositions and devices and is concerned with an improvement in or modification of the invention described in U.S. Patent No. 3,233,974, issued February 8, 1966, to William Bradley and assigned to the instant assignee.

The invention described in the aforementioned application relates to a composition for detecting glucose in urine which comprises glucose oxidase, a catalyst which causes the oxidation of oxidation indicators in the presence of hydrogen peroxide and an indicator which is oxidized by hydrogen peroxide in the presence of said catalyst and undergoes a color reaction during such oxidation, said indicator being of the general formula:

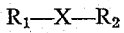

where each of $R_1$ and $R_2$ is an arkyl group which may have hydroxy and methoxy substituents and X is the radical

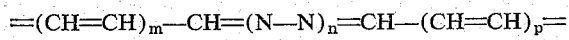

where $m$ is zero or one, $p$ is zero or one and $n$ is zero or one.

It has now been found and forms the basis of the present invention that when the above mentioned composition also contains certain aromatic or aliphatic aldehydes, namely syringicaldehyde, benzaldehyde, 3,4,5-trimethoxy benzaldehyde, 4-ethoxy-3-methoxy benzaldehyde, 3-methoxy benzaldehyde, 5-hydroxy pentanal, 3-methoxy butyraldehyde, 3-hydroxy benzaldehyde, and 3-methoxy-4-hydroxy benzaldehyde, the composition will provide much better quantitative determination of glucose, the color reactions develop much more rapidly and the composition is substantially more stable than the composition of U.S. Patent No. 3,233,974.

The enzymes used in the compositions of this invention are glucose aerodehydrogenase, sometimes known as glucose oxidase, which is capable of converting glucose to gluconic acid in the presence of atmospheric oxygen and at the same time forming hydrogen peroxide, and a substance having peroxidase activity which is capable of oxidizing certain substances such as oxidizable dyes when it is present together with such dyes and hydrogen peroxide. Examples of such substances having peroxidase activity are peroxidase and catalase. Other substances which have catalytic activity such that they will cause the oxidation of oxidizable dyes in the presence of such dyes and hydrogen peroxide are exemplified by metalloporhydrins, e.g., hemin and uroferriporphyrin chloride, iodide-molybdate mixed salts such as sodium molybdate and potassium iodide mixed salts. In place of potassium iodide and sodium molybdate other iodides such as sodium and ammonium iodides and other molybdates such as potassium and ammonium molybdates may also be used. Still other substances which exhibit catalytic activity so as to cause the oxidation of oxidizable dyes in the presence of hydrogen peroxide include normal whole blood, red blood cells alone, lyophilized whole blood and like substances.

Preferably the composition also contains a buffer for maintaining a desired pH range in the presence of urine and a protein or protein degradation product. In the present composition a desirable pH range is between about 2 and 8, with the preferred range being between about 4 and 6.

Although the test device itself may comprise the reagent composition in the form of a tablet, powder or other embodiment, we prefer to affix the reagent composition on bibulous base materials or carriers, such as strips or sticks of filter paper, by dissolving the components in a suitable solvent, impregnating the strips with the resulting solution and drying the impregnated strips (although drying is not essential). Other materials which may be used for the test device include splinters or sticks of wood, cellulose derivatives such as cellulose acetate, and glass, metal or plastic, with gelatin or a similar adhesive material being used to effect adhesion of the composition to the test strip.

In use, an impregnated strip is dipped into the liquid specimen to be tested. When contacted with urine containing glucose, the strip will give a positive reaction as evidenced by a change in color. In the case of a tablet composition, a drop or two of the liquid test specimen is applied to the face of the tablet which will change color in the event of a positive reaction.

In accordance with the present invention we have also found that the accuracy of quantitative determination is further improved by addition of o-tolidine to the reagent composition. Although the exact mechanism of the reaction is not fully understood, the superior quantitating ability of the present composition is believed to be due to preferential oxidation of the mixed chromogens at different glucose levels. Thus, if we consider a vanillin-azine/syringicaldehyde system, which gives a color change in the presence of glucose from yellow to purple, and an o-tolidine system, which gives a color change from light yellow to blue, then it is possible in a vanillinazine/syringicaldehyde/o-tolidine system that the o-tolidine competes more successfully at low glucose concentrations for the available oxygen, but the vanillinazine/syringicaldehyde mixture competes more successfully at higher glucose concentrations. In the present composition, therefore, the net effect is a color change from yellow to light green to dark green to grey to purple to dark purple with increasing concentrations of glucose.

PREPARATION OF REAGENT STRIPS

Narrow strips of a filter paper mounted on racks are dipped into the impregnating solution so that the process of submersion and capillary attraction about one-half inch of the strip at one end is completely impregnated. Immediately thereafter the strips are placed in a drying tunnel or in a forced air oven and dried at 85° C.

When strips is prepared according to the foregoing procedure and impregnated with the compositions of the following examples are contacted with urine containing glucose, or other glucose-containing solutions the reagent portion of the strip will exhibit a color reaction in which the intensity of the color and the rate of development of the reaction is roughly proportional to the concentration of glucose in the test specimen.

The following examples serve to illustrate the present invention, but are not to be construed in a limitative sense. The reagent portion of strips impregnated with the compositions of Examples I to VIII, following give a violet-blue color when contacted with test specimens containing glucose.

*Example I.—Formulation of the impregnating solution*

| | |
|---|---|
| Glucose oxidase _____g__ | 9.6 |
| Peroxidase _____g__ | 0.2 |
| Citric acid _____g__ | 14.8 |
| Sodium citrate _____g__ | 65.2 |
| Gelatin _____g__ | 9.6 |
| Vanillinazine _____g__ | 1.0 |
| Syringicaldehyde _____g__ | 1.0 |
| Alcohol (95% ethanol) _____ml__ | 200 |
| Water (distilled) _____ml__ | 600 |

PREPARATION OF THE IMPREGNATING SOLUTION (1) 9.6 g. of gelatin was added to 200 ml. of hot distilled water. The container was kept hot and stirred occasionally until the gelatin was dissolved. Prior to use the gelatin was liquefied and the temperature raised to 95° F.

(2) To 200 ml. of distilled water was added 14.8 g. of citric acid and 62.5 g. of sodium citrate and the mixture stirred until the solids dissolved.

(3) 1.0 g. of vanillinazine and 1.0 g. of syringicaldehyde was added to the 200 ml. of alcohol and stirred just prior to the final mixing. This was a crude suspension.

(4) 5 to 10 minutes before use the peroxidase was dissolved, with stirring, in 200 ml. of distilled water and the glucose oxidase was then added and stirred until dissolved.

For the final mix the gelatin solution (1) was poured into a stainless steel container and the buffer solution (2) was added rapidly with stirring. Next the vanillinazine/syringicaldehyde suspension was stirred in, any remaining in the beaker being rinsed out with the gelatin/buffer solution. Finally, the enzyme solution (3) was added, with stirring, until solution was complete.

*Example II*

The formulation of the impregnating solution was identical to the solution of Example I with the exception that 1 g. of benzaldehyde was used instead of syringicaldehyde. Preparation of the impregnating solution was according to the procedure of Example I.

*Example III*

The formulation of the impregnating solution was identical to the solution of Example I with the exception that 1 g. of 3,4,5-trimethoxy benzaldehyde was used instead of syringicaldehyde. Preparation of the impregnating solution was according to the procedure of Example I.

*Example IV*

The formulation of the impregnating solution was identical to the solution of Example I with the exception that 1.0 g. of 4-ethoxy-3-methoxy benzaldehyde was used instead of syringicaldehyde. Preparation of the impregnating solution was according to the procedure of Example I.

*Example V*

The formulation of the impregnating solution was identical to the solution of Example I with the exception that 1.0 g. of 3-methoxy benzaldehyde was used instead of syringicaldehyde. Preparation of the impregnating solution was according to the produce of Example I.

*Example VI*

The formulation of the impregnating solution was identical to the solution of Example I with the exception that 1.0 g. of 5-hydroxy pentanal was used instead of syringicaldehyde. Preparation of the impregnating solution was according to the procedure of Example I.

*Example VII*

The formulation of the impregnating solution was identical to the solution of Example I with the exception that 1.0 g. of 3-methoxy butyraldehyde was used instead of syringicaldehyde. Preparation of the impregnating solution was according to the procedure of Example I.

*Example VII*

The formulation of the impregnating solution was identical to the solution of Example I with the exception that 2.0 g. each of vanillinazine and syringicaldehyde were used instead of 1 g. of these materials. Preparation of the impregnating solution was according to the procedure of Example I. The intensity and the rate of development of the color reaction was observed to be equally as good as that provided by the composition of Example I.

*Example IX*

The formulation of the impregnating solution was identical to the solution of Example VIII with the exception that 2.0 g. of syringicaldazine were used instead of vanillinazine. Preparation of the impregnating solution was identical to the solution of Example I. The reagent portion of strips impregnated with the composition of this example give a mauve color when contacted with urine containing glucose, or other glucose-containing solutions.

*Example X*

The formulation of the impregnating solution was identical to the solution of Example VIII with the exception that 2.0 g. of 2,4,6,2',4',6'-hexahydroxy benzaldazine were used instead of vanillinazine. Preparation of the impregnating solution was identical to the solution of Example I. The reagent portion of strips impregnated with the composition of this example give a violet-blue color when contacted with urine containing glucose, or other glucose-containing solutions.

*Example XI*

The formulation of the impregnating solution was identical to the solution of Example VIII with the exception that 2.0 g. of 3,4,3',4'-tetrahydroxy benzaldazine were used instead of vanillinazine. Preparation of the impregnating solution was identical to the solution of Example I.

*Example XII.—Formulation of the impregnating solution*

| | |
|---|---|
| Gelatin _____g__ | 4.8 |
| Sodium citrate _____g__ | 32.6 |
| Citric Acid _____g__ | 7.4 |
| Glucose oxidase _____g__ | 4.8 |
| Peroxidase _____g__ | 0.1 |
| o-Tolidine dihydrochloride _____g__ | 0.8 |
| Vanillinazine _____g__ | 0.4 |
| Syringicaldehyde _____g__ | 0.4 |
| Industrial methylated spirit _____ml__ | 80 |
| Water (distilled) _____ml__ | 300 |

The above composition was prepared according to the procedure of Example I. Reagent strips prepared according to the procedure described herein were then impregnated with the composition of this example, and dipped into urine speciments containing various concentrations of glucose. The color reaction obtained at each level of glucose concentration is shown in Table I below:

TABLE I

| Concentration of glucose (percent): | Color |
|---|---|
| 0 | Yellow. |
| 0.01 | Pale Green. |
| 0.05 | Green. |
| 0.1 | Green/blue. |
| 0.25 | Blue. |
| 0.5 | Blue/purple. |
| 1.0 | Purple. |
| 2.0 | Dark purple. |

*Example XIII.—Formulation of the impregnating solution*

| | | |
|---|---|---|
| Gelatin | g | 4.8 |
| Sodium citrate | g | 32.6 |
| Citric acid | g | 7.4 |
| Glucose oxidase | g | 4.8 |
| Peroxidase | g | 0.1 |
| o-Tolidine dihydrochloride | g | 0.8 |
| Vanillinazine | g | 0.8 |
| Syringicaldehyde | g | 0.8 |
| Industrial methylated spirit | ml | 80 |
| Water (distilled) | ml | 300 |

The above composition was prepared according to the procedure of Example XII. Reagent strips prepared according to the procedure described herein were then impregnated with the composition of this example and dipped into urine specimens containing various concentrations of glucose. The color reaction obtained at each level of glucose concentration is shown in Table II below:

TABLE II

| Concentration of glucose (percent): | Color |
|---|---|
| 0 | Yellow. |
| 0.01 | Pale Green. |
| 0.05 | Green/purple. |
| 0.1 | Pale purple. |
| 0.25 | Purple. |
| 0.5 | Dark purple. |
| 1.0 | Do. |
| 2.0 | Do. |

From the data of Examples XII and XIII it is readily apparent that the inclusion of o-tolidine in the compositions of this invention provides improved quantitative determination of the concentration of glucose in solutions.

The glucose oxidase used in the compositions of this invention has an activity of 2600 units per gram, a unit being by definition that quantity of enzyme which will cause a rate of oxygen uptake of 10 cubic mm. of oxygen at 30° C. by a solution of glucose contained in a Warburg flask. The peroxidase used was obtained from horseradish, and its activity was of about the same order as that of hemoglobin in blood.

There is a wide variability possible in the ratio of glucose oxidase and peroxidase, or a like substance having peroxidase-like activity, which can be used in preparing the compositions of this invention. For example, the glucose oxidase content can be increased as much as 100 times and decreased to as little as 1/10 of the amount disclosed herein and still provide a functional testing device. Generally speaking, it is necessary only that there be sufficient glucose oxidase to catalyze the oxidation of the glucose and enough substance having peroxidase or peroxidase-like activity so that it can exercise its own enzymic activity.

A particularly important aspect of the present invention is that it enables concentrations of hydrogen peroxide to be determined quickly and in a roughly quantitative manner. We have found that a different quantitative response to hydrogen peroxide can be achieved in two ways:

(1) By a suitable choice of substrate, or
(2) In the case of a selected substrate, by varying the physical conditions in which it is used, for example, by varying the concentrations of active ingredients, varying the pH, and by other suitable means.

While gelatin is a preferred proteinaceous material for the compositions of the present invention, other substances, including other proteins may also be used; for example, dog plasma, dog serum, dried beef serum, bovine albumin and egg albumin. Casein and soluble starch (Merck) are also useful though generally to a more limited extent. And, in general, other soluble proteins, as well as plasma and serum may be effectively used as stabilizing agents. The stabilizing effect of these materials is similar to that obtained with gelatin, though to a lesser degree. Examples of substitutes that may be used for, but preferably with, gelatin, are products such as the plastic spray known as "Spraint," soluble starch (Merck), bovine albumin, gum ghatti, rubber cement, egg albumin, casein, starch glycolate, plaster of Paris, a household glue sold under the trademark Glyptal, pectin, varnish such as that sold commercially under the trade name Cenco Label Varnish, potato starch and Canada balsam. Generally speaking, any common adhesive material which does not contain glucose would be suitable for this purpose, particularly if used in combination with gelatin or other proteins.

What is claimed is:

1. A composition for detecting glucose in body fluids which comprises glucose oxidase; a substance having peroxidative activity; a compound of the formula

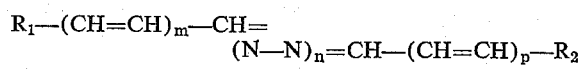

$$R_1-(CH=CH)_m-CH=$$
$$(N-N)_n=CH-(CH=CH)_p-R_2$$

where $m$ is a member selected from the group consisting of zero and one, $n$ is a member selected from the group consisting of zero and one, $p$ is a member selected from the group consisting of zero and one, and each of $R_1$ and $R_2$ is a member selected from the group consisting of —OH substituted phenyl groups and —OCH$_3$ and —OH substituted phenyl groups; and an aldehyde compound selected from the group consisting of syringicaldehyde, benzaldehyde, 3,4,5-trimethoxy benzaldehyde, 4-ethoxy-3-methoxy benzaldehyde, 3-methoxy benzaldehyde, 5-hydroxy pentanal, 3-methoxy butyraldehyde, 3-hydroxy benzaldehyde and 3-methoxy-4-hydroxy benzaldehyde.

2. A composition according to claim 1 which also contains o-tolidine.

3. A composition according to claim 1 which contains a buffer for maintaining the pH of the composition about between 2 and 8 in the presence of urine, and a proteinaceous material.

4. A composition according to claim 1 wherein the substance having peroxidative activity is peroxidase.

5. A composition for detecting glucose in urine which comprises glucose oxidase; peroxidase; a member selected from the group consisting of vanillinazine, syringicaldazine, 2,4,6,2′,4′6′-hexahydroxy benzaldazine 3,4,3′,4′-tetrahydroxy benzaldazine; a member selected the group consisting of syringicaldehyde, benzaldehyde, 3,4,5-trimethoxy benzaldehyde, 4-ethoxy-3-methoxy benzaldehyde, 3-methoxy benzaldehyde, 5-hydroxy pentanal, 3-methoxy butyraldehyde, 3-hydroxy benzaldehyde and 3-methoxy-4-hydroxy benzaldehyde; and o-tolidine.

6. A test indicator for detecting glucose in urine comprising, in combination, a bibulous carrier impregnated with a mixture consisting essentially of glucose oxidase; peroxidase; a member selected from the group consisting of vanillinazine, syringicaldazine, 2,4,6,2′,4′,6′-hexahydroxy benzaldazine and 3,4,3′,4′-tetrahydroxy benzaldazine; a member selected from the group consisting of syringicaldehyde, benzaldehyde, 3,4,5-trimethoxy benzaldehyde, 4-ethoxy-3-methoxy benzaldehyde, 3-methoxy benzaldehyde, 5-hydroxy pentanal, 3-methoxy butyraldehyde, 3-hydroxy benzaldehyde and 3-methoxy-4-hydroxy benzaldehyde; and o-tolidine.

7. A test indicator according to claim 6 wherein the mixture impregnated on the bibulous carrier contains a buffer for maintaining the pH of the composition about between 2 and 8 in the presence of urine, and a proteinaceous material.

References Cited by the Examiner

UNITED STATES PATENTS 3,233,974  2/1966  Bradley _____ 195—103.5 X

A. LOUIS MONACELL, *Primary Examiner.*

ALVIN E. TANENHOLTZ, *Examiner.*